(12) United States Patent
Einig et al.

(10) Patent No.: US 11,590,945 B2
(45) Date of Patent: Feb. 28, 2023

(54) ELECTROHYDRAULIC VEHICLE BRAKING SYSTEM HAVING REDUNDANT HYDRAULIC PRESSURE GENERATION, AND METHOD FOR OPERATING THE BRAKING SYSTEM

(71) Applicant: ZF Active Safety GmbH, Koblenz (DE)

(72) Inventors: Frank Einig, Ochtendung (DE); Blaise Ganzel, Ann Arbor, MI (US); Nicholas Alford, Waldesch (DE)

(73) Assignee: ZF Active Safety GmbH, Koblenz (DE)

( * ) Notice: Subject to any disclaimer, the term of this patent is extended or adjusted under 35 U.S.C. 154(b) by 482 days.

(21) Appl. No.: 16/697,879

(22) Filed: Nov. 27, 2019

(65) Prior Publication Data
US 2020/0172067 A1 Jun. 4, 2020

(30) Foreign Application Priority Data
Nov. 29, 2018 (DE) .......................... 102018009370.1

(51) Int. Cl.
*B60T 13/68* (2006.01)
*B60T 8/36* (2006.01)
(Continued)

(52) U.S. Cl.
CPC .............. *B60T 8/363* (2013.01); *B60T 7/042* (2013.01); *B60T 8/344* (2013.01); *B60T 8/3635* (2013.01);
(Continued)

(58) Field of Classification Search
CPC .......... B60T 8/363; B60T 8/344; B60T 8/348; B60T 8/4072; B60T 8/4081;
(Continued)

(56) References Cited

U.S. PATENT DOCUMENTS

2012/0074771 A1* 3/2012 Vollert .................. B60T 13/745
303/114.1
2013/0207452 A1* 8/2013 Gilles ................... B60T 13/168
303/9.62
(Continued)

FOREIGN PATENT DOCUMENTS

DE 19718533 A1 11/1998

*Primary Examiner* — Vishal R Sahni
(74) *Attorney, Agent, or Firm* — Robert James Harwood (57) ABSTRACT

An electrohydraulic vehicle braking system is provided, comprising an electrically controllable first hydraulic pressure generator and an electrically controllable second hydraulic pressure generator. The braking system further comprises a first valve device for each wheel brake, having at least one first valve, wherein in an electrically uncontrolled state the first valve device separates its associated wheel brake from an output of the first hydraulic pressure generator, and in an electrically controlled state connects it to the output of the first hydraulic pressure generator. In addition, a second valve device for each wheel brake is provided, having a second valve between an output of the second hydraulic pressure generator and its associated wheel brake, as well as a third valve between this wheel brake and a first hydraulic fluid reservoir. The first valve device and the second valve device are arranged in parallel to one another.

18 Claims, 3 Drawing Sheets

(51) Int. Cl.
  *B60T 8/34* (2006.01)
  *B60T 7/04* (2006.01)
  *B60T 8/40* (2006.01)
  *B60T 13/74* (2006.01)
(52) U.S. Cl.
  CPC ............ *B60T 8/409* (2013.01); *B60T 13/686* (2013.01); *B60T 13/745* (2013.01); *B60T 2270/402* (2013.01)
(58) Field of Classification Search
  CPC .... B60T 13/165; B60T 13/167; B60T 13/168; B60T 13/18; B60T 13/20; B60T 13/62; B60T 13/686; B60T 2270/402
  See application file for complete search history.

(56) References Cited

U.S. PATENT DOCUMENTS

| | | | | |
|---|---|---|---|---|
| 2014/0319902 | A1* | 10/2014 | Benzler | B60T 13/745 303/6.01 |
| 2015/0197230 | A1* | 7/2015 | Kolarsky | B60T 8/4872 701/70 |
| 2015/0307072 | A1* | 10/2015 | Strengert | B60T 13/662 303/81 |
| 2016/0137175 | A1* | 5/2016 | Bunk | B60T 8/172 701/78 |
| 2016/0152221 | A1* | 6/2016 | Furuyama | B60T 11/28 303/11 |
| 2016/0193990 | A1* | 7/2016 | Drumm | B60T 8/4077 701/70 |
| 2017/0274883 | A1* | 9/2017 | Kim | B60T 13/686 |
| 2018/0126969 | A1* | 5/2018 | Blattert | B60T 8/447 |
| 2019/0126899 | A1* | 5/2019 | Strehle | B60T 13/146 |
| 2019/0248352 | A1* | 8/2019 | Neu | B60T 8/17 |
| 2019/0344766 | A1* | 11/2019 | Kurz | B60T 13/686 |
| 2019/0344767 | A1* | 11/2019 | Bareiss | B60T 7/12 |
| 2020/0172067 | A1* | 6/2020 | Einig | B60T 13/686 |
| 2020/0189546 | A1* | 6/2020 | Dolmaya | B60T 13/18 |
| 2020/0339086 | A1* | 10/2020 | Grimm | B60T 13/662 |
| 2021/0070267 | A1* | 3/2021 | Weh | B60T 8/4081 |

* cited by examiner

ELECTROHYDRAULIC VEHICLE BRAKING SYSTEM HAVING REDUNDANT HYDRAULIC PRESSURE GENERATION, AND METHOD FOR OPERATING THE BRAKING SYSTEM

CROSS-REFERENCE TO RELATED APPLICATION

This application claims priority to German Patent Application No. 102018009370.1, filed Nov. 29, 2018, the disclosure of which is incorporated herein by reference in its entirety.

TECHNICAL FIELD

The present disclosure relates in general to the field of vehicle braking systems. In particular, an electrohydraulic vehicle braking system having redundant hydraulic pressure generation and a method for operating the braking system are provided.

BACKGROUND

Electrohydraulic vehicle braking systems according to the brake-by-wire (BBW) principle include an electrically controllable hydraulic pressure generator which during service braking operation generates the brake pressure at the wheel brakes of the vehicle. A vehicle deceleration that is requested by the driver at a brake pedal is detected by sensor and converted into a control signal for the electrically controllable hydraulic pressure generator.

To allow a brake pressure to be built up at the wheel brakes, even if the electrically controllable hydraulic pressure generator fans, braking systems that are operable according to the BBW principle have thus far additionally included a master cylinder, via which hydraulic fluid may likewise be conveyed to the wheel brakes. When the braking system is operating normally, the master cylinder is decoupled from the wheel brakes, or the brake pedal is decoupled from the master cylinder. In this case, a wheel brake pressure is bunt up solely by means of the electrically controllable hydraulic pressure generator. In contrast, during emergency braking operation, for example if the electrically controllable hydraulic pressure generator fails, this decoupling is discontinued. The driver him/herself may then generate a brake pressure at the wheel brakes by means of the master cylinder.

Due to the discontinued decoupling, the emergency braking operation is also referred to as a pushthrough (PT) operation. The option afforded to the driver for building up a brake pressure at the wheel brakes via the master cylinder in PT operation provides redundancy which is essential based on safety considerations. Motor vehicle braking systems for autonomous or semiautonomous driving must also be redundantly designed. However, in such cases it cannot be assumed that the driver is present in the vehicle (in a remote-controlled parking (RCP) operation, for example), or that the driver is able to immediately actuate a brake pedal for the PT operation (for example, when the driver is looking away from the road).

For this reason, in addition to a function unit that provides an electrically controllable main braking function, braking systems for autonomous or semiautonomous driving must also include a further function unit that can redundantly implement an electrically controllable auxiliary braking function. In this case, two electrically controllable hydraulic pressure generators are used to provide redundancy in the hydraulic pressure generation. Due to this redundancy, consideration may also be given to dispensing with the master cylinder and the PT functionality.

SUMMARY

The object of the present disclosure is to provide an electrohydraulic vehicle braking system that includes two redundantly electrically controllable hydraulic pressure generators and has an efficient design.

According to a first aspect, an electrohydraulic vehicle braking system is provided that includes an electrically controllable first hydraulic pressure generator and an electrically controllable second hydraulic pressure generator. The braking system also includes a first valve device for each wheel brake, having at least one first valve, wherein in an electrically uncontrolled state the first valve device separates its associated wheel brake from an output of the first hydraulic pressure generator, and in an electrically controlled state connects it to the output of the first hydraulic pressure generator. In addition, the braking system includes a second valve device for each wheel brake, having a second valve between an output of the second hydraulic pressure generator and its associated wheel brake, as well as a third valve between this wheel brake and a first hydraulic fluid reservoir, wherein the first valve device and the second valve device are arranged in parallel to one another.

The first valve device and the second valve device may, for example, be arranged in two parallel branches of a hydraulic line, starting from the corresponding wheel brake branch point. The branch associated with the second valve device may divide into two subbranches in which the second valve and the third valve are respectively arranged, in parallel to one another.

According to one variant, the second valve is designed, in the electrically uncontrolled state, to prevent a hydraulic fluid flow from the output of the second hydraulic pressure generator to the wheel brake associated with the second valve. The second valve may be a 2/2-way valve. The second valve may have a check valve function. This applies in particular to its blocked position, which then has a blocking action in both flow directions. The third valve, in the electrically uncontrolled state, may prevent a hydraulic fluid flow from the wheel brake associated with the third valve to the first hydraulic fluid reservoir. The third valve may be a 2/2-way valve. The third valve may have a check valve function to allow a hydraulic fluid flow towards the wheel brake associated with the third valve in the electrically uncontrolled state.

The first valve arrangement in its blocked position may in particular have no check valve function. The first valve arrangement may comprise the first valve. In other words, the first valve device may include no other valve besides the first valve.

According to a first variant, the first valve is a 2/2-way valve. According to a second variant, the first valve is a 3/2-way valve. These two variants are combinable so that the braking system includes multiple first valve devices, the first valve of at least one of the first valve devices being a 2/2-way valve, and the first valve of at least another of the valve devices being a 3/2-way valve.

In general, the braking system may include a master cylinder, which is actuatable by means of a brake pedal, for generating brake pressure at a wheel brake in a pushthrough operation. In this case, the first valve device may be designed to selectively connect an output of the master cylinder or the output of the first hydraulic pressure generator to at least one wheel brake ("switchover function"). In particular, in this case the first valve device may include exactly one 3/2-way valve. However, it may also include two 2/2-way valves for implementing the switchover function.

The braking system may also include a third valve device that is arranged between the output of the master cylinder and the first valve device (which is then designed as a 3/2-way valve, for example). In this case, the first valve device and the third valve device in their respectively electrically uncontrolled state connect the output of the master cylinder to the wheel brake associated with the first valve device. The braking system may also include a pedal retroaction simulation unit that is actuatable by means of a brake pedal. The pedal retroaction simulation unit may be based on a mechanical or a hydraulic principle.

In no valve position can the braking system allow a hydraulic engagement towards a wheel brake when the brake pedal is actuated. In other words, in this case the braking system has no PT operation, so that the master cylinder may also be dispensed with.

According to one variant, the braking system includes no further valve device besides the first valve device between the output of the first hydraulic pressure generator and each wheel brake. In this case, only the switching state of the first valve device determines whether or not a hydraulic pressure can be built up in a certain wheel brake by means of the first hydraulic pressure generator.

The braking system may also include at least one fourth valve device that is arranged between the second valve and the output of the second hydraulic pressure generator on one side, and the first and/or a second hydraulic fluid reservoir on the other side. In an electrically controlled state, the at least one fourth valve device may prevent a hydraulic fluid flow from the output of the second hydraulic pressure generator into the first and/or second hydraulic fluid reservoir. The fourth valve device may include or comprise a valve. The valve may be a 2/2-way valve. This valve in the electrically uncontrolled state may have a throughflow position. In addition, the valve may have a check valve function to allow a hydraulic fluid flow towards the second valve in the electrically controlled state.

The braking system may include a fifth valve device that is arranged between an input of the second hydraulic pressure generator and a, or the, second hydraulic fluid reservoir. In an electrically uncontrolled state, the fifth valve device may prevent a hydraulic fluid flow from the second hydraulic fluid reservoir to the second hydraulic pressure generator. The fifth valve device may be arranged between the input of the second hydraulic pressure generator and the first hydraulic fluid reservoir on one side, and the second hydraulic fluid reservoir on the other side.

The fifth valve device may include or comprise a valve. This valve may be a 2/2-way valve. In an electrically uncontrolled state, the valve may prevent a hydraulic fluid flow from the second hydraulic fluid reservoir to the input of the second hydraulic pressure generator. The valve may have a check valve function to allow hydraulic fluid to flow back into the second hydraulic fluid reservoir in the electrically uncontrolled state.

The first hydraulic fluid reservoir may be designed as a low-pressure accumulator. For a multicircuit braking system, a first hydraulic fluid reservoir may be provided for each brake circuit. The second hydraulic fluid reservoir may be formed by a pressureless reservoir.

The braking system may include one or more controls, Each control may be provided in the form of program code in a control unit and executed by a processor of the control unit. In this regard, a single control unit may implement multiple different controls. Alternatively, it would also be conceivable to implement various controls in different control units.

According to one variant, the braking system includes a first control that is designed to reduce a hydraulic pressure, built up at at least one wheel brake by means of the first hydraulic pressure generator, by discharging hydraulic fluid into (at least) the first hydraulic fluid reservoir. The first control may in particular be designed to close the second valve associated with the wheel brake and to open the third valve associated with the wheel brake in order to discharge the hydraulic fluid into the first hydraulic fluid reservoir. The opening or closing may take place by electrical control or refraining from electrical control, depending on the design of the valve.

The braking system may include multiple first valve devices. In this case, the braking system may also include a second control that is designed to control the multiple first valve devices in a time-division multiplex operation in order to set different hydraulic pressures at different wheel brakes by means of the first hydraulic pressure generator. In the time-division multiplex operation, a specific time slot, for which a hydraulic pressure may be built up or reduced at the corresponding wheel brake by means of the first hydraulic pressure generator, may be associated with each wheel brake. The time-division multiplex operation may take place in particular within the scope of a brake pressure control intervention.

In conjunction with the multiplex operation, the second control may be designed in particular to then selectively control the first valve devices in the multiplex operation when a loss of function is recognized with regard to the second hydraulic pressure generator and/or the second valve device. Thus, for example, the second hydraulic pressure generator and the second valve device may be provided for carrying out brake pressure control interventions at a certain wheel brake during normal braking operation (i.e., when no loss of function is present). If there is a loss of function with regard to the second hydraulic pressure generator and/or the second valve device, this task may then be taken over by the first hydraulic pressure generator and the first valve device.

Multiple second valve devices may be provided. In this case, the braking system may include a third control that is designed to control the multiple second valve devices in order to set different pressures at different wheel brakes by means of the second hydraulic pressure generator. Setting different pressures at different wheel brakes, using the second hydraulic pressure generator and the second valve devices, may take place in particular in conjunction with brake pressure control interventions, for example during normal braking operation.

In addition, the braking system may include a fourth control that is designed to control the second hydraulic pressure generator for carrying out service braking, when a loss of function with regard to the first hydraulic pressure generator and/or the first valve device is recognized. Thus, for example, during normal braking operation, service braking may be carried out by means of the first hydraulic pressure generator and with the first valve device open. If multiple wheel brakes and multiple first valve devices are present, all first valve devices may be opened for service braking. In the emergency braking operation, for example when there is a loss of function with regard to the first hydraulic pressure generator and/or the first valve device, the service braking functionality may then be taken over by the second hydraulic pressure generator (when the second valve device provided for each wheel brake is suitably controlled).

The first hydraulic pressure generator and the first valve device may be installed in a first subassembly. The second hydraulic pressure generator and the second valve device may be installed in a second subassembly that is manageable separately from the first subassembly. Such a modular design allows a flexible combination of various subassemblies with one another.

According to a second aspect, a method for operating an electrohydraulic vehicle braking system is provided which is designed according to the first aspect. The method includes the step of electrically controlling the first valve device and the first hydraulic pressure generator to build up a brake pressure at the wheel brake associated with the first valve device, wherein the second valve and the third valve are in a switching state that prevents escape of hydraulic fluid from the wheel brake.

The method may include one or more steps, as described above and discussed below. In addition, a computer program product is provided which includes program code for carrying out the method presented here, when the program code is executed on the processor of a control unit.

Also provided is a control unit or a control unit system made up of multiple control units, wherein the control unit or control unit system includes at least one processor and at least one memory, and wherein the memory contains program code which, when executed by the at least one processor, causes the steps of the method provided here to be carried out.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
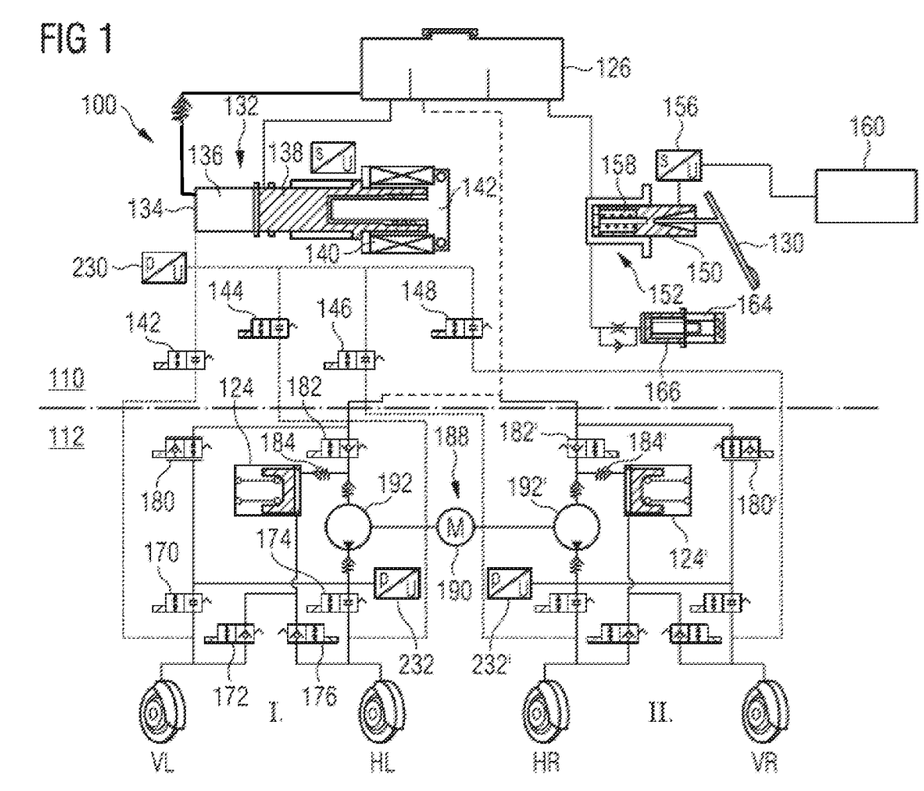
FIG. 1 shows a first exemplary embodiment of an electrohydraulic vehicle braking system, without PT functionality, in a first operating state.

FIG. 1 shows the hydraulic circuit diagram of a first exemplary embodiment of an electrohydraulic vehicle braking system 100 according to the BBW principle. As shown in FIG. 1, the braking system 100 includes a first function unit 110 that provides an electrohydraulic main braking function, and a second function unit 112 that redundantly implements an electrohydraulic auxiliary braking function. The two function units 110, 112 are each designed to build up a brake pressure at all wheel brakes VL, VR, HL, HR of the vehicle. In the present context, "main braking unit" means that the first function unit 110 is provided for carrying out service braking according to the BBW principle during normal braking operation (i.e., when no error is present). In the present context, "auxiliary braking function" means that the second function unit 112, in the event of a functional failure in the area of the first function unit 110, i.e., during emergency braking operation, is provided instead of the first function unit 110 for carrying out service braking operations according to the BBW principle. During normal braking operation, the second function unit 112 is responsible for carrying out brake pressure control interventions. When there is a functional failure in the area of the second function unit 112, i.e., during emergency braking operation, these brake pressure control interventions are then taken over by the first function unit 110.

Due to the redundancies provided by the two function units 110, 112, the braking system 100 is suitable for an autonomous or semiautonomous driving operation. Therefore, a PT functionality may be dispensed with. In fact, according to the exemplary embodiment according to FIG. 1, a master brake cylinder and the option, usually present, of a hydraulic engagement starting from a brake pedal actuation by a driver, may be dispensed with.

The two function units 110, 112 may be accommodated as separate modules in separate housing blocks. Thus, depending on the requirements, the first function unit 110 may be installed either alone or in combination with the second function unit 112, or vice versa. In addition, a modular combination of the first function unit 110 or the second function unit 112 with a third function unit is also possible.

As illustrated in FIG. 1, the second function unit 112 has a symmetrical design with respect to two brake circuits I. and II. The first brake circuit I. includes the two wheel brakes VL and HL, while the second brake circuit II. includes the two wheel brakes HR and VR. Due to this symmetry, only the first brake circuit I. is considered in greater detail in the following discussion. The statements in this regard similarly apply to the second brake circuit II.

The braking system 100 operates with the aid of a hydraulic fluid that is stored in portions in three hydraulic fluid reservoirs 124, 124', 126. The two reservoirs 124, 124' installed in the second function unit 112 are each designed as low-pressure accumulators (LPAs) and are associated with one of the two brake circuits I. and II., respectively, while the third reservoir 126 is a central pressureless reservoir. In general, the additional hydraulic fluid volume within the braking system 100 that is necessary for compensating for brake lining wear may be provided by the central reservoir 126, while, apart from this, the braking system 100 is configured as a closed hydraulic system. The central reservoir 126 has a larger capacity than the two accumulators 124, 124'. However, the volume of the hydraulic fluid stored in each of the two low-pressure accumulators 124, 124' is at least sufficient for allowing a vehicle to be reliably brought to a standstill during an emergency braking operation.

The first function unit 110 includes a first electrically controllable hydraulic pressure generator 132 for generating brake pressure autonomously, semiautonomously, or as requested by the driver at a brake pedal 130 during BBW operation. In the exemplary embodiment, this hydraulic pressure generator 132 includes a cylinder-piston arrangement 134 according to the plunger principle, with a cylinder chamber 136 and a piston 138 that is movable therein. The cylinder chamber 136 is coupleable to the pressureless reservoir 126 and also to the four wheel brakes VL, HL, VR, HR. The piston 138 of the hydraulic pressure generator 132 is driven by an electric motor 140 via a gear system 142. In the exemplary embodiment, the gear system 142 is implemented as a ball screw drive, and is designed to convert a rotational motion of the electric motor 140 into a translational motion of the piston 138.

In the present exemplary embodiment, four valves 142, 144, 146, 148, each forming a valve device and actuated by electromagnets and connected to one another in parallel, are associated with the hydraulic pressure generator 132. One of the valves 142, 144, 146, 148 in each case is arranged between the cylinder chamber 136 of the hydraulic pressure generator 132, on one side, and each of the four wheel brakes VL, HL, VR, HR on the other side. The valves 142, 144, 146, 148 are each designed as a 2/2-way valve without a check valve function.

When reference is made below to a certain valve being electrically controlled, this means control of the electromagnet associated with the corresponding valve.

FIG. 1 shows the braking system 100 in an electrically uncontrolled state. In this state, the valves 142, 144, 146, 148 assume their blocked position. The hydraulic pressure generator 132 is therefore fluidically separated from the wheel brakes VL, HL, VR, HR. For carrying out service braking for a wheel brake pressure buildup by means of the hydraulic pressure generator 132, the four valves 142, 144, 146, 148 must be electrically controlled beforehand in order to bring each of them into a throughflow position.

Control of the hydraulic pressure generator 132 and the four valves 142, 144, 146, 148 within the scope of service braking requested by the driver at the brake pedal 130 takes place according to the displacement of a piston 150 of a cylinder-piston arrangement 152 coupled to the brake pedal 130. The displacement of the piston 150 during a brake pedal actuation is detected by a path sensor 156, and converted into control signals for the hydraulic pressure generator 132 and the four valves 142, 144, 146, 148 by a control unit 160 that is coupled to the path sensor 156.

The hydraulic fluid that is displaced from a cylinder chamber 158 of the cylinder-piston arrangement 152 by the piston 152 [sic; 150] during a brake pedal actuation is received by a hydraulic pedal retroaction simulation unit 164. The pedal retroaction simulation unit 164 is likewise designed as a cylinder-piston arrangement, and includes a displaceable piston 166. The piston 166 is acted on by elastic force in order to incorporate the accustomed pedal retroaction behavior into the pedal retroaction simulation unit 164 when hydraulic fluid is displaced from the cylinder-piston arrangement 152.

The second function unit 112, in addition to the two low-pressure accumulators 124, 124' described above, includes an electrically controllable hydraulic pressure generator 188. The hydraulic pressure generator 188 is controllable by the control unit 160 or a separate control unit. In one embodiment, each function unit 110, 112 includes a separate control unit. The two control units may then communicate with one another in order to recognize a loss of function in the area of the respective other function unit and to allow suitable measures to be initiated. In the exemplary embodiment, the hydraulic pressure generator 188 of the second function unit 112 includes an electric motor 190 and a pump 192, 192', designed as a gear pump or radial piston pump, for example, for each brake circuit I. or II., respectively, and each having an input and an output. Each pump 192, 192' blocks in the direction opposite its inlet direction and conveying direction, as illustrated by the check valves at the input and output of the pumps 192, 192'. The pumps 192, 192' are each configured for drawing in hydraulic fluid from the associated low-pressure accumulator 124, 124' or the central reservoir 126. Since the speed of the electric motor 192 [sic; 190] is adjustable, the output of each of the pumps 192, 192' may also be adjusted by appropriately controlling the electric motor 192 [sic; 190]. In another embodiment, the two pumps 192, 192' could also be replaced by a single pump that operates according to the plunger principle (for example, with a single- or double-action cylinder-piston arrangement; see reference numeral 132). As mentioned above, the second function unit 112 has a symmetrical design with respect to the brake circuits I. and II. Therefore, only the components of the second function unit 112 associated with the first brake circuit I. are explained in greater detail below.

The hydraulic connection of the wheel brakes VL, HL of brake circuit I. is determined by 2/2-way valves 170, 172, 174, 176 which are actuated by electromagnets, and which in the unactuated, i.e., electrically uncontrolled, state assume the base positions illustrated in FIG. 1. This means that the valves 170, 172, 174, 176 each assume their blocked position. The valves 170 and 174 are designed as 2/2-way valves without a check valve function, and are arranged between the output of the hydraulic pressure generator 188 on one side, and the corresponding wheel brake VL or HL on the other side. The valves 172 and 176 are designed as 2/2-way valves having a check valve function, and are arranged between the corresponding wheel brake VL or HL on one side, and the low-pressure accumulator 124 on the other side. The two valves 170 and 172 form a valve arrangement that is associated with the wheel brake VL, while the two valves 174 and 176 form a valve arrangement that is associated with the wheel brake HL.

As is apparent in FIG. 1, the valves 170 and 172 are arranged in two branches of a first hydraulic line that extends in parallel to a second hydraulic line in which the valve 142 is arranged. Both hydraulic lines lead to the wheel brake VL. Thus, the valves 142, 170, and 172 are arranged in parallel to one another (the same applies for the valves 144, 174, 176 associated with the wheel brake HL, etc.). The valves 170, 172 and 174, 176 associated with the wheel brakes VL and HL, respectively, as well as the hydraulic pressure generator 188 are in each case designed to be controlled at the respective wheel brake VL or HL for wheel brake pressure control interventions. The control of the valve arrangement 170, 172, the valve arrangement 174, 176, and the hydraulic pressure generator 188 within the scope of the wheel brake pressure control interventions takes place via the control unit 160 or another control unit. The control unit in question implements, for example, the wheel brake regulation control functions of an antilock braking system (ABS), driving dynamics control (for example, electronic stability control (ESC)), a traction control system (TCS), or adaptive cruise control (ACC).

For an antilock braking system (ABS), the aim is to prevent locking of the wheels during service braking requested by the driver at the brake pedal 130. For this purpose, it is necessary to individually modulate the brake pressure in the wheel brakes VL, VR, HL, HR. This takes place by making adjustments in alternation, in a time sequence, to the pressure buildup, pressure maintenance, and pressure reduction phases, which result from suitable control of the valve arrangements 170, 172 and 174, 176 associated with the wheel brakes VL and HL, and optionally of the hydraulic pressure generator 188.

During a pressure buildup phase, the valve 170 or 174 at whose associated wheel brake VL or HL a pressure increase is to take place is electrically controlled and then assumes its throughflow position, so that an increase in the brake pressure in the wheel brakes VL and HL may take place by means of the hydraulic pressure generator 188. In contrast, the valve 172 or 176 assumes its blocking base position illustrated in FIG. 1, so that the pressurized hydraulic fluid cannot escape to the low-pressure accumulator 124. For a pressure maintenance phase, at one of the wheel brakes VL or HL none of the valves 170, 172 or 174, 176 is controlled. The valves 170, 172 or 174, 176 thus remain blocking. As a result, the wheel brake VL or HL is hydraulically decoupled, so that a wheel brake pressure that is present is held constant. During a pressure reduction phase at one of the wheel brakes VL or HL, the valve 172 or 176 is controlled, i.e., brought into its throughflow position, while the valve 170 or 174 is uncontrolled and therefore remains in its blocked position. Thus, hydraulic fluid may flow from the wheel brake VL or HL into the low-pressure accumulator 124 in order to reduce a brake pressure that is present in the wheel brake VL or HL.

Other brake pressure control interventions typically take place independently of an actuation of the brake pedal 130 by the driver. Such automated regulations of the wheel brake pressure take place, for example, in conjunction with a traction control system (TCS), which by means of targeted deceleration prevents spinning of individual wheels during a starting operation, electronic stability control (ESC), which adapts the vehicle behavior in the borderline area to the driver's intent and the roadway conditions by means of targeted deceleration of individual wheels, or adaptive cruise control (ACC), which among other things maintains a distance from the host vehicle to a preceding vehicle by means of automatic braking. For purposes of TSC, ESC, or ACC, a brake pressure is built up at at least one of the wheel brakes VL and HL by controlling the hydraulic pressure generator 188. For this purpose, the valve 172 or 176 associated with the corresponding wheel brake VL or HL assumes its blocking base position illustrated in FIG. 1, while the valve 170 or 174 is electrically controlled and thus opened. A fine adjustment or modulation of the brake pressure may be carried out by appropriately controlling the brake pressure generator 188 and the valves 170, 172 and 174, 176, as explained above in conjunction with the ABS control.

As shown in FIG. 1, the components of the second function unit associated with the first brake circuit I. include two further 2/2-way valves 180, 182 that are actuated by electromagnets, each with a check valve function. The valve 180 is arranged between the two valves 170, 174 and the output of the hydraulic pressure generator 188 on one side, and the reservoir 126 on the other side. The valve 182 is arranged between the input of the hydraulic pressure generator 188 and the output of the reservoir 124 on one side, and the reservoir 126 on the other side.

In its electrically uncontrolled state the valve 180 is in its throughflow position, whereas the valve 182 is then in its blocked position (however, due to the check valve function, hydraulic fluid can flow back into the reservoir 126, for example for ABS control with a completely filled low-pressure accumulator 124). When the valve 180 is transferred to its blocked position by electrical control, hydraulic fluid may flow towards the valves 170, 174 due to the check valve function.

Figure 2:
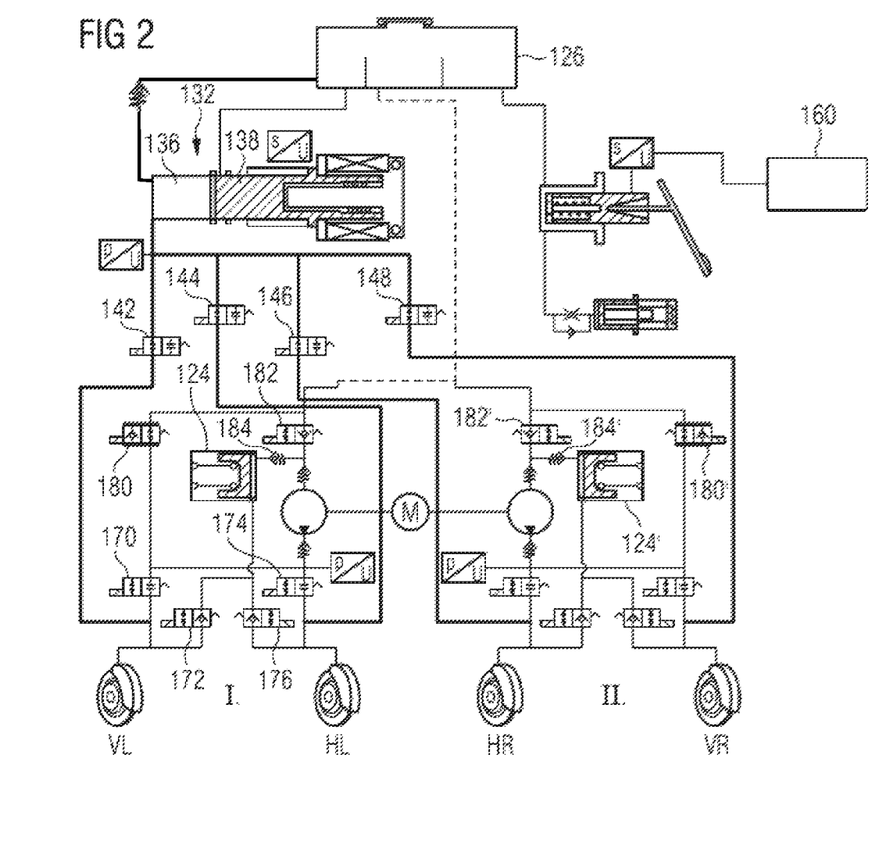
FIG. 2 shows the vehicle braking system according to FIG. 1 in a second operating state.

During normal braking operation, i.e., when both function units 110, 112 are fully operational, service braking operations are carried out by means of the first function unit 110, while the second function unit 112 is used in conjunction with brake pressure control interventions. To be able to build up a wheel brake pressure during normal braking operation by means of the function unit 110, the valves 142, 144, 146, 148 are opened by electrical control. This operating state of the braking system 100 is illustrated in FIG. 2. By actuating the hydraulic pressure generator 132, hydraulic fluid may now be displaced from the cylinder chamber 136 to the four wheel brakes VL, HL, HR, VR, thus building up a wheel brake pressure. In contrast, the valves 170, 172, 174, 176 of the first brake circuit I. associated with these wheel brakes VL, HL, HR, VR, and the corresponding valves of the second brake circuit II., are in their blocking base positions, so that the hydraulic fluid that is placed under pressure by the hydraulic pressure generator 132 cannot flow from the wheel brakes VL, HL, HR, VR into the function unit 112.

In order to once again reduce the wheel brake pressure that is present in the wheel brakes VL, HL, VR, HR within the scope of a service braking operation, according to one variant the valves 172 and 176 (and the corresponding valves of the second brake circuit II.) are opened. The pressurized hydraulic fluid may then flow into the low-pressure accumulator 124, 124'. If the low-pressure accumulators 124, 124' are completely full, for a further wheel brake pressure reduction, hydraulic fluid may flow into the central reservoir 126 via a check valve 184, 184' provided at an output of the particular low-pressure accumulator 124 and via the valves 182, 182'. According to an alternative wheel brake pressure reduction variant, the hydraulic pressure generator 132 may also be used for reducing the wheel brake pressure. In particular, in this case the piston 138 is moved back, so that the volume of the cylinder chamber 136 is once again increased and the cylinder chamber 136 can receive hydraulic fluid from the wheel brakes VL, HL, HR, VR.

The function unit 112 is used for brake pressure control interventions during normal braking operation, i.e., when the braking system 100 is fully operational. Examples of brake pressure control interventions have been described above with regard to ABS, ESC, TCS, and ACC. To avoid an undesirable loss of wheel brake pressure due to hydraulic fluid flowing through the valves 142, 144, 146, 148, these valves 142, 144, 146, 148 are closed. The valve 180 is likewise closed, and the valve 182 remains in its blocking base position. The hydraulic pressure generator 188 may now draw in hydraulic fluid from one of the low-pressure accumulators 124, 124' and supply it to one of the wheel brakes VL, HL, HR, VR via the valve 170 or 174, which is then transferred to its open position (and similarly for the second brake circuit II.). If a low-pressure accumulator 124, 124' is completely empty, additional hydraulic fluid may be drawn in from the central reservoir 126.

If a loss of function occurs in the area of the function unit 112, for example due to failure of the hydraulic pressure generator 188, brake pressure control interventions are taken over by the function unit 110. For this purpose, the valves 142, 144, 146, 148 are controlled in multiplex operation to allow an individual brake pressure to be set for each wheel brake VL, HL, HR, VR by means of the hydraulic pressure generator 132. A specific time slot, for which a wheel brake pressure may be built up or reduced by means of the first hydraulic pressure generator 132, is associated with each wheel brake VL, HL, HR, VR, As mentioned above, a reduction in wheel brake pressure takes place by retraction of the piston 138 into the cylinder chamber 136.

On the other hand, if a loss of function occurs in the area of the first function unit 110, for example due to failure of the hydraulic pressure generator 132, the function unit 112 also takes over service braking operations. For this purpose, the valves 170, 174 (and the corresponding valves of brake circuit II.) are opened and the hydraulic pressure generator 188 is actuated to convey hydraulic fluid from the low-pressure accumulators 124, 124' and/or the central reservoir 126 in order to build up wheel brake pressure at the wheel brakes VL, HL, VR, HR. In contrast, the valves 172 and 176 (and the corresponding valves of brake circuit II.) remain in their blocked positions until the wheel brake pressure has to be reduced once again.

Since each of the two function units 110, 112 can take over the functions of the respective other function unit 112, 110, a high level of redundancy is provided. At the same time, the braking system 100 has a low level of complexity, since a master cylinder may be dispensed with on account of this redundancy. In addition, only a small number of valves is required, which for the most part may have a very simple design (for example, without a check valve function). The braking system 100 thus has a design that is highly redundant and at the same time efficient.

Figure 3:
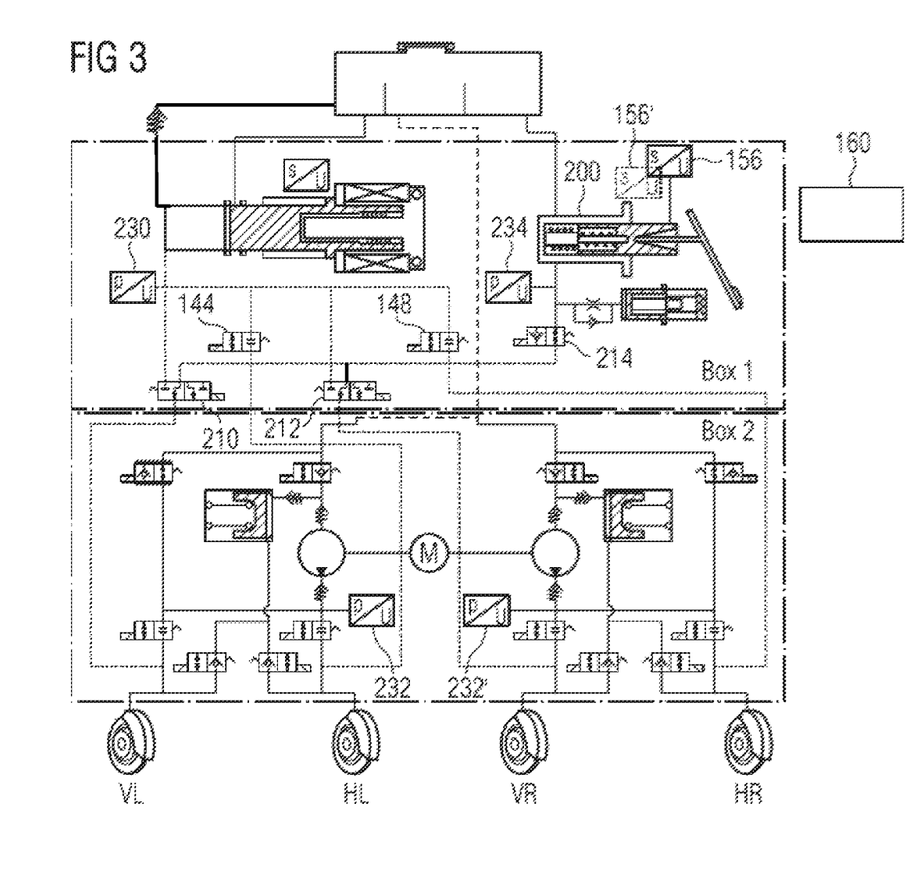
FIG. 3 shows a second exemplary embodiment of an electrohydraulic vehicle braking system, with PT functionality.

To further increase the redundancy, the cylinder-piston arrangement 152 from FIGS. 1 and 2 may be replaced by a master cylinder 200. This situation is illustrated in FIG. 3. The master cylinder 200 may form a part of the function unit 110. In the present exemplary embodiment, the master cylinder 200 has a single-circuit design. Of course, consideration may also be given to using a dual-circuit master cylinder 200.

Starting from the master cylinder 200, the two brake circuits I. and II. may be supplied with pressurized hydraulic fluid redundantly with regard to the two electrically controllable hydraulic pressure generators 132, 188. For this purpose, the two valves 142, 146 from FIGS. 1 and 2 have been replaced by a 3/2-way valve 210, 212, respectively. In addition, a further 2/2-way valve 214 is provided between these two 3/2-way valves 210, 212 on one side and the master cylinder 200 on the other side. The valves 210, 212, 214 are each actuatable by an electromagnet, and in the electrically uncontrolled state assume the base positions illustrated in FIG. 3. In these base positions, the valves 210, 212, 214 couple the master cylinder 200 to the wheel brakes VL. VR, HL, HR. Thus, even if there is a complete failure of the power supply (and an accompanying failure of the two hydraulic pressure generators 132, 188), the driver can still build up hydraulic pressure at the wheel brakes VL, HL, VR, HR (PT operation).

In contrast, in BBW operation the valves 210, 212 are electrically controlled. In this switching state, the valves 210, 212 then decouple the master cylinder 200 from the wheel brakes VL, HL, VR, HR. As explained with reference to FIGS. 1 and 2, the hydraulic pressure buildup at the wheel brakes VL, HL, VR, HR may then take place by electrically controlling one of the hydraulic pressure generators 132, 188. If only the hydraulic pressure generator 132 fails, carrying out brake pressure control interventions by means of the function unit 112 is still possible, also in PT operation. In this case the valve 214 may be closed in order to suitably hydraulically decouple the master cylinder 200 from a brake pressure control intervention.

The braking systems 100 illustrated in FIGS. 1 through 3 may undergo various test procedures. Thus, the functionality of the hydraulic pressure generator 132 may be tested by closing the valves 142, 144, 146, 148 (or 210, 144, 212, 146) and building up a hydraulic pressure by means of the hydraulic pressure generator 132. The hydraulic pressure that is thus built up may be tested for a sufficient pressure level by means of a pressure sensor 230 (for example, by comparison to a threshold value). To reduce the rigidity of the test system, one of the valves 142, 144, 146, 148 (or 210, 144, 212, 146) may be opened within the scope of the test procedure. Such individual opening of one of the valves 142, 144, 146, 148 (or 210, 144, 212, 146) also allows a leak test for each wheel brake VL, HL, HR, VR.

For testing the functionality of the hydraulic pressure generator 188, the valve 180 (and the corresponding valve 180' of brake circuit II.) may be closed, and a hydraulic pressure may be built up by means of the hydraulic pressure generator 188. The corresponding hydraulic pressure may then be measured by suitable sensors 230. 230' and compared to threshold values (and similarly for brake circuit II.). In addition, to reduce the system rigidity, one of the valves 170, 174 may be opened (and similarly for brake circuit II.). In this way, a leak test is likewise possible for wheel brakes VL, HL, HR, VR.

In addition, to further increase the redundancy, the pedal travel sensor 156 may be provided with double or triple redundancy (see FIG. 3), For triple redundancy, the BBW operation may be based on the two best matching sensor signals. For the triple redundancy, two path sensors 156, 156' and a pressure sensor 234 provided on the output side of the master cylinder 200 may also be used, as illustrated in FIG. 3. Such a pressure sensor 234 could also be used in the exemplary embodiment according to FIGS. 1 and 2.

The braking system 100 presented here has a high level of redundancy, and thus a high level of fail-safe operation. This fail-safe operation may be even further increased by providing a master cylinder 200 and redundant sensor systems 156, 156', 234. In addition, in any case an uncomplicated implementation may be achieved with regard to the installed valves.

What is claimed is:

1. An electrohydraulic vehicle braking system having wheel brakes, comprising:
   an electrically controllable first hydraulic pressure generator;
   a first valve device for each of the wheel brakes, each first valve device having a first valve, wherein in an electrically uncontrolled state the first valve device separates its associated wheel brake from an output of the first hydraulic pressure generator, and in an electrically controlled state the first valve device connects its associated wheel brake to the output of the first hydraulic pressure generator;
   an electrically controllable second hydraulic pressure generator; and
   a second valve device for each of the wheel brakes, each second valve device having a second valve and a third valve, each second valve being located between an output of the second hydraulic pressure generator and its associated wheel brake, each third valve being located between its associated wheel brake and a first hydraulic fluid reservoir, wherein the first valve device and the second valve device of their associated wheel brake are arranged in parallel to one another and for their associated wheel brake the second valve and the third valve are downstream of the first valve.

2. The braking system according to claim 1, wherein in the electrically uncontrolled state, each second valve prevents a hydraulic fluid flow from the output of the second hydraulic pressure generator to the wheel brake associated with each second valve, each second valve has no check valve function, each third valve prevents a hydraulic fluid flow from the wheel brake associated with each third valve to the first hydraulic fluid reservoir, and each third valve has a check valve function to allow a hydraulic fluid flow towards the wheel brake associated with each third valve in the electrically uncontrolled state.

3. The braking system according to claim 1, wherein each first valve has no check valve function.

4. The braking system according to claim 1, wherein each first valve is a 2/2-way valve.

5. The braking system according to claim 1, wherein each first valve is a 3/2-way valve.

6. The braking system according to claim 1, wherein the first valve of at least one of the first valve devices is a 2/2-way valve, and the first valve of at least another of the first valve devices is a 3/2-way valve.

7. The braking system according to claim 1, further comprising a master cylinder, which is actuatable by means of a brake pedal, for generating brake pressure at a wheel brake in a push-through operation, wherein each first valve device is designed to selectively connect an output of the master cylinder or the output of the first hydraulic pressure generator to at least one wheel brake.

8. The braking system according to claim 7, wherein a single fourth valve is arranged between and fluidly connected to the output of the master cylinder and multiple first valves.

9. The braking system according to claim 8, wherein each first valve and the fourth valve in their respectively electrically uncontrolled state connect the output of the master cylinder to the wheel brake associated with the first valve.

10. The braking system according to claim 1, further comprising:
 a pedal retroaction simulation unit that is actuatable by means of a brake pedal; and
 at least one fourth valve device that is arranged between each second valve and the output of the second hydraulic pressure generator on one side, and the first and/or a second hydraulic fluid reservoir on the other side;
 wherein in no valve position does the braking system allow a hydraulic engagement towards a wheel brake when the brake pedal is actuated; and in an electrically controlled state, the at least one fourth valve device prevents a hydraulic fluid flow from the output of the second hydraulic pressure generator into the first and/or second hydraulic fluid reservoir.

11. The braking system according to claim 1, wherein the braking system comprises no further valve device besides the first valve device between the output of the first hydraulic pressure generator and each wheel brake.

12. The braking system according to claim 10, further comprising a fifth valve device that is arranged between an input of the second hydraulic pressure generator and an output of the first hydraulic fluid reservoir on one side and an output of the second hydraulic fluid reservoir on another side.

13. The braking system according to claim 12, wherein in an electrically uncontrolled state, the fifth valve device prevents a hydraulic fluid flow from the second hydraulic fluid reservoir to the input of the second hydraulic pressure generator.

14. The braking system according to claim 1, further comprising:
 a first control that is designed to reduce a hydraulic pressure, built up at least one wheel brake by means of the first hydraulic pressure generator, by discharging hydraulic fluid the first hydraulic fluid reservoir, wherein the first control is designed to close the second valve associated with the wheel brake and to open the third valve associated with the wheel brake in order to discharge the hydraulic fluid into the first hydraulic fluid reservoir.

15. The braking system according to claim 1, further comprising:
 a control that is designed to control the second valve devices in order to set different pressures at different wheel brakes by means of the second hydraulic pressure generator; and
 a second control that is designed to control the first valve devices in a time-division multiplex operation in order to set different hydraulic pressures at different wheel brakes by means of the first hydraulic pressure generator;
 wherein the second control is designed to selectively control the first valve devices in multiplex operation when a loss of function is recognized with regard to the second hydraulic pressure generator and/or the second valve devices.

16. The braking system according to claim 1, further comprising a fourth control that is designed to control the second hydraulic pressure generator for carrying out service braking, when a loss of function with regard to the first hydraulic pressure generator and/or the first valve device is recognized.

17. The braking system according to claim 1, wherein the first hydraulic pressure generator and the first valve device are installed in a first subassembly; and the second hydraulic pressure generator and the second valve device are installed in a second subassembly that is redundant to the first subassembly.

18. A method for operating an electrohydraulic vehicle braking system having wheel brakes, comprising the following:
 an electrically controllable first hydraulic pressure generator;
 a first valve device for each of the wheel brakes, each first valve device having a first valve, wherein in an electrically uncontrolled state the first valve device separates its associated wheel brake from an output of the first hydraulic pressure generator, and in an electrically controlled state the first valve device connects its associated wheel brake to the output of the first hydraulic pressure generator;
 an electrically controllable second hydraulic pressure generator; and
 a second valve device for each of the wheel brakes, each second valve device having a second valve and a third valve, each second valve being located between an output of the second hydraulic pressure generator and its associated wheel brake, each third valve being located between its associated wheel brake and a first hydraulic fluid reservoir, wherein the first valve device and the second valve device of their associated wheel brake are arranged in parallel to one another and for their associated wheel brake the second valve and the third valve are downstream of the first valve;
 the method comprising the step:
 electrically controlling the first valve device to an open position and the first hydraulic pressure generator to build up a brake pressure at the wheel brake associated with the first valve device, wherein the second valve and the third valve of their associated wheel brake are in a switching state that prevents escape of hydraulic fluid from the associated wheel brake.

* * * * *